US008583809B2

(12) United States Patent
Sherkin et al.

(10) Patent No.: US 8,583,809 B2
(45) Date of Patent: Nov. 12, 2013

(54) DESTROYING A SECURE SESSION MAINTAINED BY A SERVER ON BEHALF OF A CONNECTION OWNER

(75) Inventors: Alexander Sherkin, Newmarket (CA); Srimantee Karmakar, Mississauga (CA); Laura Doktorova, Mississauga (CA); Brindusa Laura Fritsch, Toronto (CA); Kamen Vitanov, Mississauga (CA); Herbert Little, Waterloo (CA); Michael Hung, Willowdale (CA)

(73) Assignee: BlackBerry Limited, Waterloo, Ontario (CA)

( * ) Notice: Subject to any disclaimer, the term of this patent is extended or adjusted under 35 U.S.C. 154(b) by 1012 days.

(21) Appl. No.: 11/851,499

(22) Filed: Sep. 7, 2007

(65) Prior Publication Data

US 2008/0065777 A1  Mar. 13, 2008

Related U.S. Application Data

(60) Provisional application No. 60/824,820, filed on Sep. 7, 2006.

(51) Int. Cl.
*H04L 9/00* (2006.01)
*G06F 15/16* (2006.01)

(52) U.S. Cl.
USPC ........... 709/229; 709/224; 709/228; 709/227; 709/225; 713/153; 713/164; 713/152; 713/168

(58) Field of Classification Search
USPC ........................ 709/229; 726/2; 713/153, 155
See application file for complete search history.

(56) References Cited

U.S. PATENT DOCUMENTS

| | | | |
|---|---|---|---|
| 6,611,913 B1 | 8/2003 | Carrol et al. | |
| 6,886,102 B1 * | 4/2005 | Lyle | 726/23 |
| 7,123,721 B2 * | 10/2006 | Panjwani et al. | 380/270 |
| 7,181,196 B2 * | 2/2007 | Patel | 455/411 |
| 7,409,549 B1 * | 8/2008 | Leung et al. | 713/168 |
| 7,631,193 B1 * | 12/2009 | Hoffman | 713/186 |

(Continued)

FOREIGN PATENT DOCUMENTS

EP  0697154  1/2004

OTHER PUBLICATIONS

"Stronger Security of Authenticated Key Exchange"—Microsoft, Sep. 2005 http://research.microsoft.com/en-us/um/people/klauter/strongAKEMay06.pdf.*

(Continued)

*Primary Examiner* — Andrew Georgandellis
*Assistant Examiner* — Randy Scott
(74) *Attorney, Agent, or Firm* — Integral Intellectual Property Inc.; Miriam Paton

(57) ABSTRACT

A method and system for establishing a secure over-the-air (OTA) connection between a connection owner and a server, the connection owner being associated with a wireless device connected to the server via a communications network. A secure session is instantiated on behalf of the connection owner, the secure session being maintained by the server and defining a context for the secure OTA connection. A registration key and a reset key are defined, and stored in association with the secure session on both the server and the wireless device. Access to the secure session is controlled using at least the registration key, and the secure session is maintained on the server only as long as the connection owner has a valid registration key.

17 Claims, 3 Drawing Sheets

(56) References Cited

U.S. PATENT DOCUMENTS

| | | | |
|---|---|---|---|
| 2002/0123967 A1* | 9/2002 | Wang | 705/51 |
| 2002/0178354 A1* | 11/2002 | Ogg et al. | 713/155 |
| 2003/0093698 A1* | 5/2003 | Challener et al. | 713/202 |
| 2004/0187006 A1* | 9/2004 | Trapp | 713/176 |
| 2004/0193876 A1* | 9/2004 | Donley et al. | 713/162 |
| 2005/0138428 A1* | 6/2005 | McAllen et al. | 713/201 |
| 2005/0289347 A1* | 12/2005 | Ovadia | 713/171 |
| 2006/0106836 A1* | 5/2006 | Masugi et al. | 707/101 |
| 2007/0014410 A1* | 1/2007 | Panjwani et al. | 380/270 |
| 2007/0028106 A1* | 2/2007 | Lauter et al. | 713/171 |
| 2008/0044014 A1* | 2/2008 | Corndorf | 380/37 |

OTHER PUBLICATIONS

"Aggregated Path Authentication for Efficient BGP Security"—CS Dartmouth EDU, Nov. 2005 http://www.cs.dartmouth.edu/~sws/pubs/zsn05b.pdf.*

International Search Report issued Nov. 28, 2007 on applicant's corresponding International PCT Patent Application Serial No. PCT/CA2007/001582 filed Sep. 7, 2007.

Oliviera, Joel, Extended European Search Report for EP 07800601.2, Jun. 7, 2010.

International Preliminary Report on Patentability Ch 1 for PCT/CA2007/001582, Mar. 10, 2009.

"Wireless Transport Layer Security" (Version Apr. 6, 2001). Wireless Application Protocol—WAP-261-WTLS-20010406-a Apr. 6, 2001, pp. 46-71, XP003018657.

Baris Kayayurt et al.—"End to End Secuirty Implementation f r Mobile Device using TLS Protocol"—Journal in Computer Virology, Springer-Verlag, PA LNKD-DOI: 10.1007/S11416-006-0017-X, vol. 2, No. 1, Jul. 11, 2006, pp. 87-97, XP019411435 ISSN: 1772-9904.

Babin, Giles, First Office Action for CA 2,662,686, Jan. 3, 2012.
Babin, Giles, Second Office Action for CA 2,662,686, Jul. 23, 2012.

* cited by examiner

DESTROYING A SECURE SESSION MAINTAINED BY A SERVER ON BEHALF OF A CONNECTION OWNER

CROSS-REFERENCE TO RELATED APPLICATIONS

This application is based on, and claims benefit of U.S. Patent Application No. 60/824,820, filed Sep. 7, 2006, the entire content of which is hereby incorporated herein by reference.

TECHNICAL FIELD

The present disclosure relates generally to establishing a secure connection for a wireless device, and more particularly to a method and system for establishing a secure over-the-air (OTA) device connection.

BACKGROUND

Wireless communication devices often access Internet or intranet services through a proxy server rather than accessing such services directly. These services often communicate using a protocol different from that normally used by the wireless device. For example, services may use Simple Object Access Protocol (SOAP) to send and receive messages over hypertext transfer protocol/transmission control protocol (HTTP/TCP) which may be unsupported or cumbersome for the wireless device. Typically, if a wireless device needs to communicate with a server to access a service (e.g. web service), the wireless device does not construct/parse SOAP messages and send/receive SOAP messages over HTTP/TCP itself. Instead, the wireless device communicates structured data to a proxy server (such as a Blackberry Mobile Data System by RIM) that will construct/parse SOAP messages and send/receive SOAP messages over HTTP/TCP on behalf of the wireless device.

In order for the proxy server to communicate with services on behalf of the wireless device, it needs to have access to private information associated with the wireless device. Representative private information associated with the wireless device may, for example, include Secure Sockets Layer (SSL) connections, HTTP cookies, Windows NT™ LAN Manager (NTLM)-authenticated connections and subscriptions. In order to protect privacy of the information, there is a requirement for a secure connection between the wireless device and the proxy server.

While corporate or enterprise networks that enable wireless access to proxy servers typically provide data encryption and privacy solutions for hosted wireless devices, such is generally not the case in retail implementations. For example Google Talk™ or Proxy-HTTPS services, both of which may involve an exchange of private information between a wireless device and the proxy server, provide little in the way of data encryption and privacy other than the standard, relatively weak encryption provided by the wireless networks.

BRIEF DESCRIPTION OF THE DRAWINGS

Further features and advantages of the present technique will become apparent from the following detailed description, taken in combination with the appended drawings, in which.

It will be noted that throughout the appended drawings, like features are identified by like reference numerals.

DETAILED DESCRIPTION

The present disclosure describes a method and system for establishing and managing a secure over-the-air (OTA) connection between a wireless device and a server.

In general, the present technique provides methods for negotiating and managing parameters of the secure OTA connection between an "owner" of the connection and a server. A "secure session" is defined and maintained by the server, as a context for storing negotiated parameters of the connection, as well as private information associated with the connection's owner. Means are also provided to ensure that only owner of the connection is able to access and use the secure session. As a result, the secure session can be retained on the server for use by the owner as needed, so that a new secure OTA connection does not need to be negotiated each time the owner accesses the server.

For the purposes of the present disclosure, the "owner" of a secure OTA connection, or, equivalently, the owner of a "secure session", can be any combination of a wireless device and/or software that initiates the establishment of the secure OTA connection. In some cases the owner will correspond to a wireless device alone. In other cases, the owner may be a combination of the wireless device and one or more software applications. Typical examples of this latter arrangement may be: a "device/application-tuple", comprising a specific application installed on the wireless device; and a "device/application-pair", in which a specific application installed on the specific wireless device accesses a specific application on the server. Preferably, the wireless device is uniquely identified by a device identifier (ID), which may, for example, be a Personal Identification Number (PIN) stored in a non-volatile memory of the device at a time of manufacture or delivery to a subscriber. A specific application installed on the wireless device can be identified by an Application ID, which is unique at least among the applications installed on the wireless device. Similarly, each application installed on the server may be identified by a server application ID. With this arrangement, the owner of any particular secure OTA connection can be uniquely identified using an Owner ID corresponding to the device ID in combination with the application ID(s) of any application(s) that is/are included in the defined owner of that connection.

Parameters of a secure OTA connection may, for example, include a Message Authentication Code (MAC), a registration key (RK) and a reset key (RSK). Private information associated with the secure OTA connection may include, but is not limited to: Secure Sockets Layer (SSL) connections, HTTP cookies, Windows NT™ LAN Manager (NTLM)-authenticated connections and subscription information, which enables the owner to access services of either the server itself or a network accessed though the server.

Figure 1:
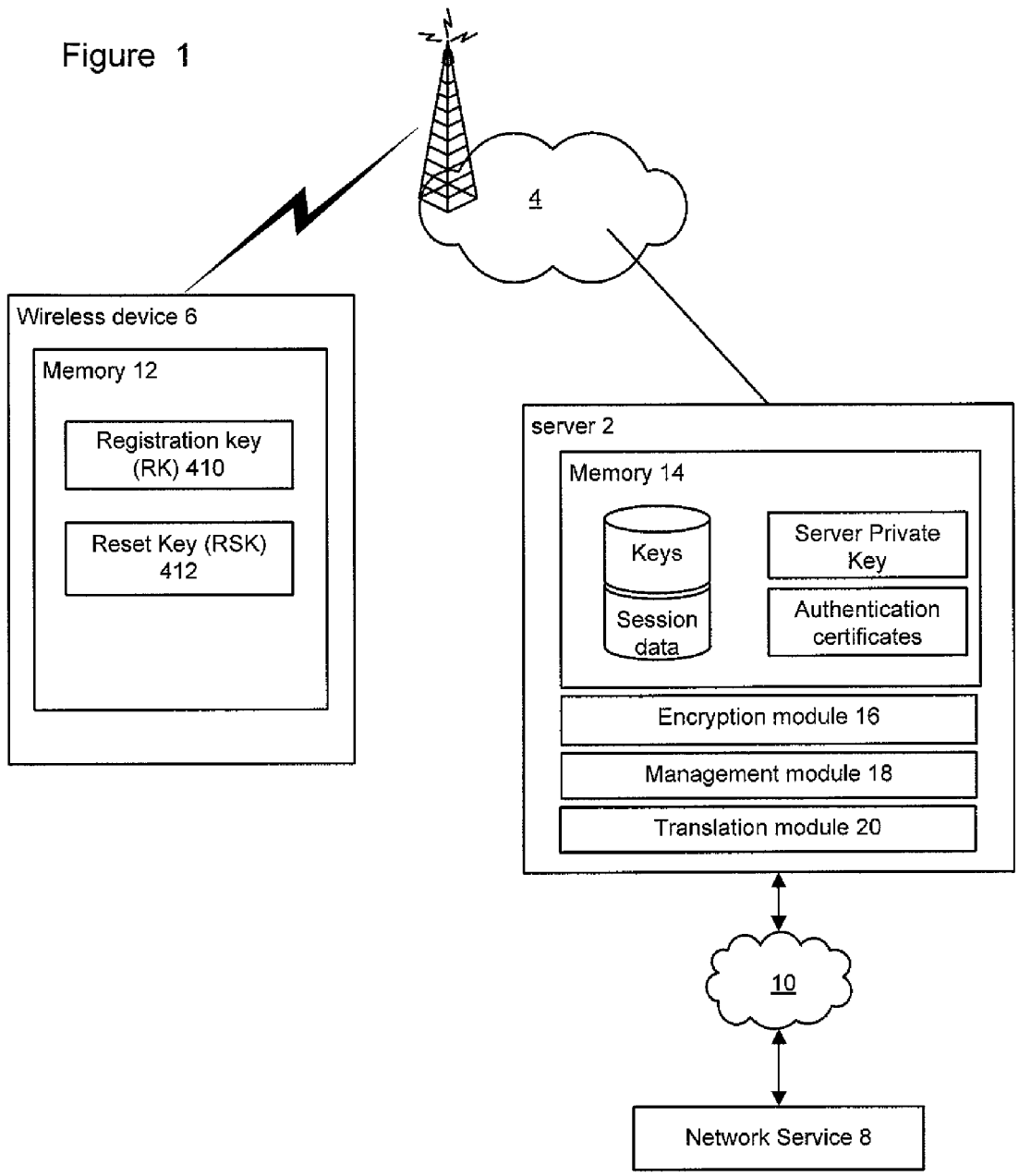
FIG. 1 is a schematic diagram illustrating a representative system for establishing a secure over-the-air (OTA) device connection.

FIG. 1 is a block diagram illustrating a representative system in which the present technique may be implemented. As may be seen in FIG. 1, the system comprises a server 2 connected to a wireless network 4 to facilitate OTA communications with one or more wireless devices 6. The server 2 may, for example, be provisioned by a network service provider, in order to host subscriber wireless devices and enable those wireless devices to access network services in a manner known in the art. Alternatively, the server 2 may be provisioned as a proxy server, to facilitate communications between wireless devices and a specific set of services. In either case, the server 2 facilitates communication between wireless devices 6 and services 8, (such as web services) which may execute either locally on the server 2 itself, or on a remote server accessed through a data network 10 such as the internet. The wireless network 4 includes antenna, base stations, and supporting radio equipment well known in the art as for supporting wireless communications between the wireless device 6 and other devices (such as the server 2) connected to wireless network 4.

The wireless device 6 is preferably a two-way communication device having at least data communication capabilities, including the capability to communicate with other computer systems. Typically, the wireless device 6 is a handheld device. Depending on the functionality provided by the wireless device 6, it may be referred to as a data messaging device, a two-way pager, a cellular telephone with data messaging capabilities, a wireless Internet appliance, or a data communication device (with or without telephony capabilities).

In the embodiment of FIG. 1, the wireless device 6 includes a memory 12 for storing data including data for use in implementing the present techniques. A runtime environment (not shown) of the wireless device 6 provides generic encryption/decryption functionality, as well as key and nonce generation, as will be explained greater detail below. In this respect, the term "generic" shall be understood to mean that the functionality is provided as utilities or services of the runtime environment, and so can be accessed and used by any application(s) installed on the wireless device 6.

In the embodiment of FIG. 1, the server 2 comprises a memory 14 having respective sectors for storing secure session information, e.g. information related to TLS/SSL connections, NTLM-authenticated connections, HTTP cookies, subscriptions, etc.; the server's private key; server authentication certificates; and respective registration and reset keys associated with each registered secure OTA connection. These sectors may be stored in any combination of Random Access Memory (RAM), mass data storage (e.g. magnetic disc) and/or any other suitable form of memory as will be understood to those skilled in the art. The server 2 also includes an encryption module 16 that is responsible for encrypting and decrypting messages (e.g. using either the server's private key, or the registration key associated with a particular secure OTA connection). The server 2 also includes a management module 18 for managing secure sessions associated with wireless devices 6 including reset operations using the reset key, etc. The server 2 also includes a translation module 20 that converts messages sent and received from the wireless device 6 to and from a format used by various network services (e.g. web services) accessed by the wireless device 6, for example SOAP messages. As may be appreciated, each of these modules 16-20 may be provided by any suitable combination of hardware and software of the server 2. Similarly, the server 2 may be configured as a single computer system, or any desired combination of one or more computers and peripheral devices connected in a secure network, such as a local area network.

In a representative embodiment, a "registration protocol" is used to register and mange secure OTA connections, such that only the connection's owner is able to access the private data (e.g. NTLM/SSL/TLS connections, etc) of their respective secure OTA connection(s). In addition, a "record protocol" may be used for secure message exchange between the server and the session owner, thereby ensuring confidentiality, data-integrity, data origin authentication, and replay prevention. Each of these protocols will be described in greater detail below.

Registration Protocol

The registration protocol preferably provides a registration and handshake procedure that enables a connection owner to establish, manage, and access a secure OTA connection with the server. In some embodiments, the registration protocol may provide separate registration, re-registration, and re-registration with reset procedures.

In some embodiments, the registration procedure may be used when the owner first registers with the server to establish a secure OTA connection. In this case, the parameters of the secure OTA connection (for example, a registration key (RK) and a reset key (RSK)) are negotiated, and a secure session instantiated on the server 2 to provide a context for the secure OTA connection. If desired, an expiry schedule can be established so that the registration and/or reset keys will expire according to a pre-determined key expiration frequency. For example, the expiry schedule may be set such that the registration key (for example) will expire every 15 days.

The registration and reset keys can be generated using any of a variety of known techniques for generating keys suitable for symmetric-key encryption, and may be of any desired length. For example, the registration and reset keys may be 128-bit keys suitable for use in the AES cipher. In some embodiments, one (or both) of the keys is(are) used to generate a unique Message Authentication Code (MAC) which can be attached to messages sent between the server and the owner. This provides a means of verifying that messages received by the server were in fact sent by the owner of the secure session, and so prevents unauthorized access to the secure session. The MAC may conveniently be composed of a comparatively short piece of information that is the output of a predetermined MAC algorithm scheme based on a variable-length message and a secret key. In the present technique, the secret key is provided by one (or both) of the registration and reset keys, which are known only to the secure session owner and (following registration) the server. As is known in the art, MAC algorithms can be based on hash functions (HMAC) or block ciphers. In some embodiments, the MAC (SHA1-HMAC) algorithm is used. MAC (SHA1-HMAC) is an algorithm that uses keyed-Hashing for Message Authentication (HMAC) defined by RFC 2104 in combination with the cryptographic hash function Secure Hash Algorithm-1 (SHA-1) defined by RFC 3174.

The registration and/or reset keys may also be used to encrypt messaging between the server and the owner, to thereby further improve security and privacy. In some embodiments, the reset key may be used to facilitate re-registration of the owner with the server, as will be described in greater detail below.

For the purposes of the Registration procedure, initial registration and reset keys can be generated by(or for) the owner of the secure connection using suitable software installed on the wireless device for that purpose. For example, software for generating keys may be provided as a generic utility of the runtime environment of the wireless device 6. Once generated, the registration and reset keys can be stored in memory of the wireless device in association with an Owner ID uniquely identifying the owner of the connection, as described above.

In some embodiments, the registration and reset keys are stored in separate regions of memory of the wireless device. With this arrangement, the reset key can be protected from being erased in an event of a "device wipe", in which most of the user data stored on in the memory of the wireless device is deleted. This arrangement enables a previously negotiated secure connection to be reset, as will be described in greater detail below.

In some embodiments, the re-registration procedure may be used as a handshake procedure in order for the owner to access a previously negotiated secure session, using session parameters stored in memory of the wireless device. In this scenario, both of the registration and reset keys will be available to the connection owner, but they may have expired on the server. In either case, the wireless device (owner) can retrieve the keys directly from device memory 12 and send them to the server, which can use this information to verify the owner and the connection, and grant access to the secure session.

In some embodiments, the re-registration with reset procedure may be used in order for the owner to reset a previously negotiated secure session. For example, a reset may be performed in a instance in which the owner is able to retrieve a reset key from memory, but not the corresponding registration key. Such a situation can, for example, result from a "device wipe" during which the registration key was deleted.

A representative registration protocol encompassing all three of the above-noted procedures is described below with reference to FIGS. 2A and 2Bb.

Figure 2A:
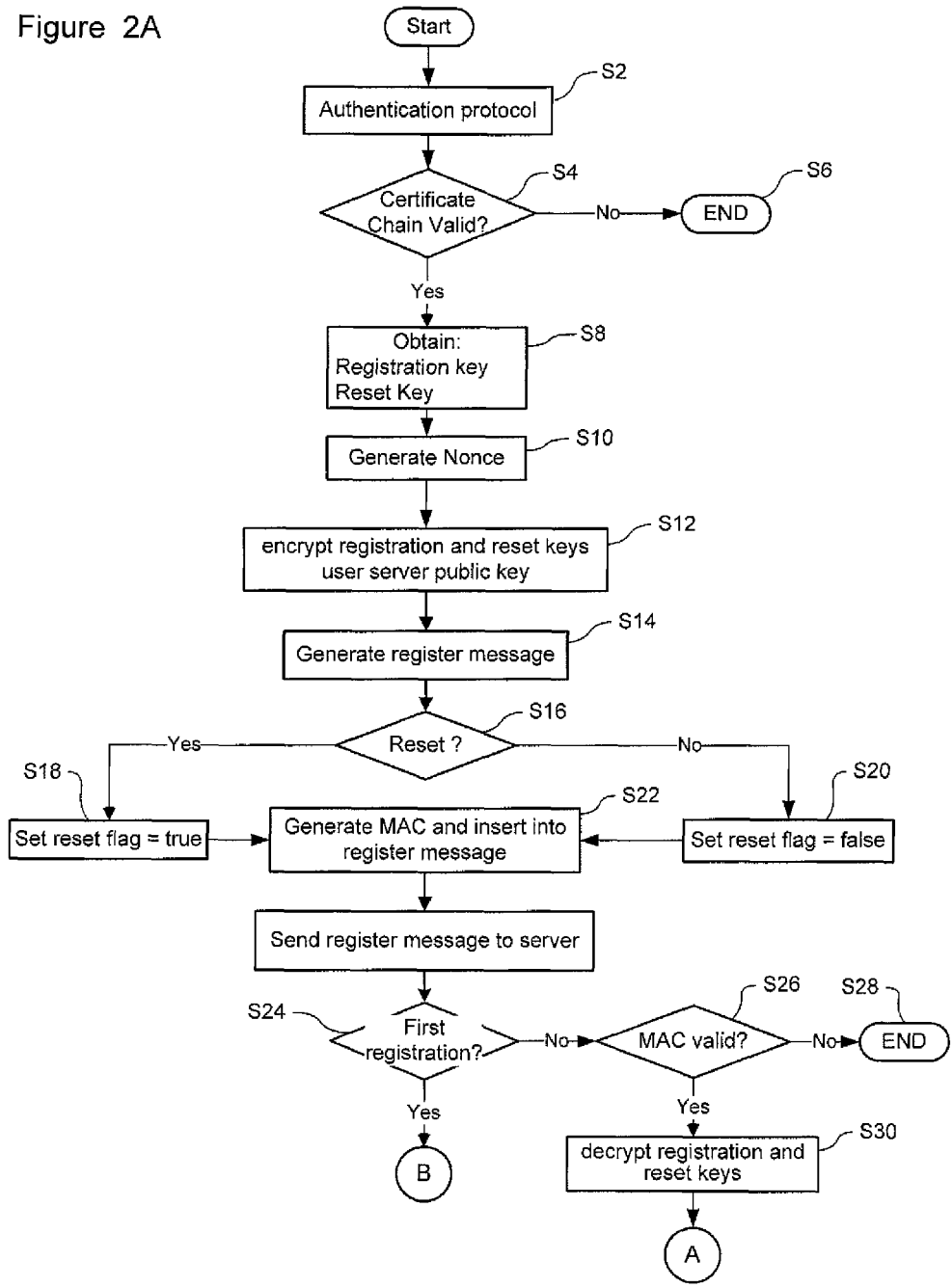
FIGS. 2A and 2B show a flowchart illustrating principal operations of a registration protocol in accordance with a representative embodiment of the present technique.
Figure 2B:
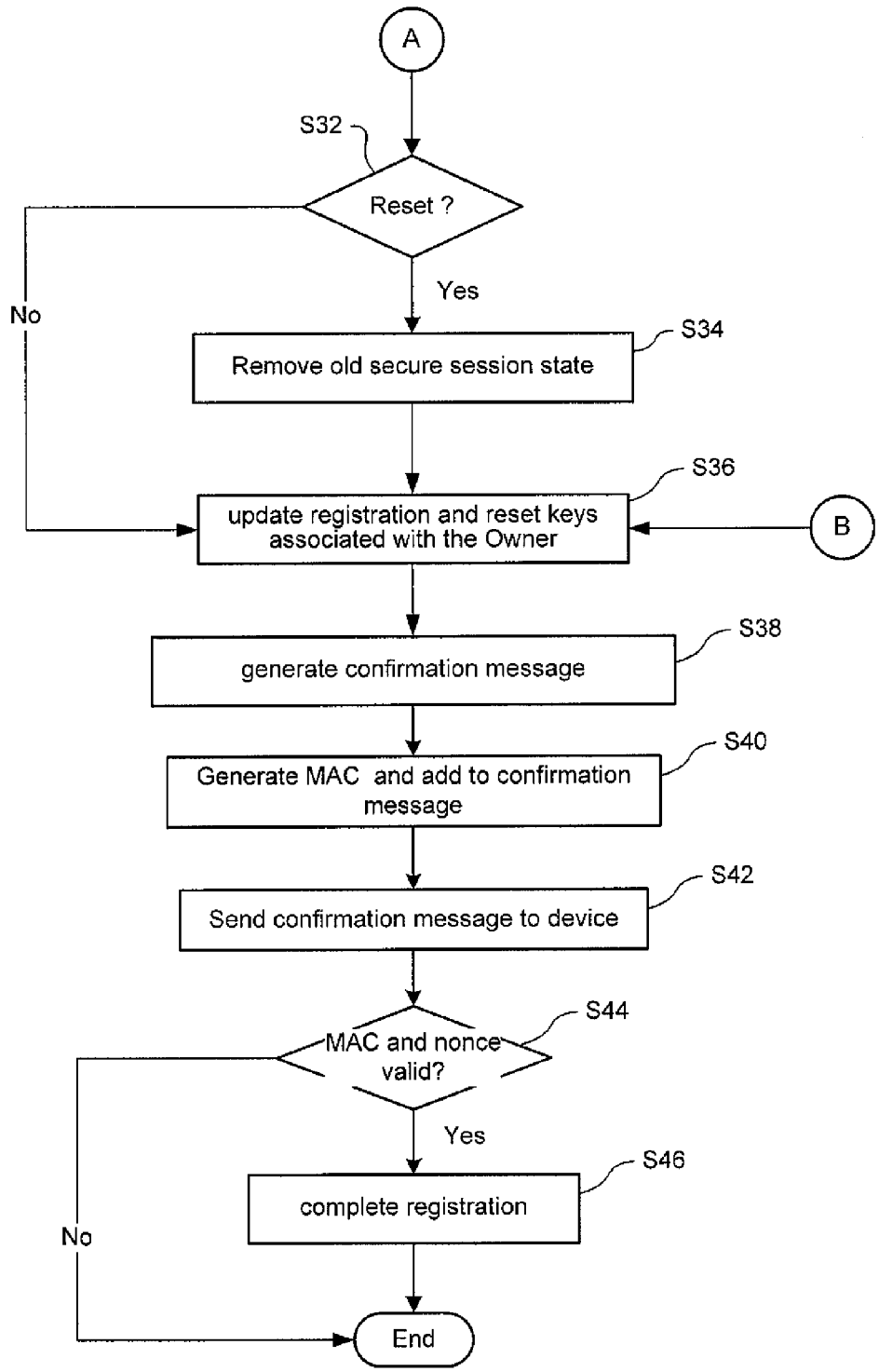

As may be seen in FIG. 2A, the wireless device 6 and server 2 exchange handshaking and authentication messages (at step S2), in a conventional manner, to authenticate the wireless device 6 and to identify an appropriate version of the security protocol to use, i.e. the highest version supported by both the wireless device 6 and the server 2. The wireless device 6 also receives a certificate chain from the proxy server, as well as a public key belonging to the server 2, again, in a conventional manner.

Upon completion of the authentication protocol, the wireless device 6 verifies (at step S4) the certificate chain received from the server, against an internal list of trusted certificates stored in memory, to authenticate the proxy server 2. If the certificate chain is not valid, the registration process terminates (at S6). If desired, a warning massage may be displayed on a screen of the wireless device 6, so as to inform the user of the reason for terminating the registration process. If the certificate chain is valid, the wireless device 6 either generates an initial set of registration and reset keys (in the case of an initial registration) or else retrieves previously saved keys from device memory 12 (at S8) as described above, and generates a Nonce (at S10).

As will be understood by a person of ordinary of skill in the art, a nonce is a "number used once" that consists of a random number which is generated and attached to each message, so that messages cannot be resent, for example in replay attacks. The nonce can be any suitable size byte array with good entropy (for example, a byte array of size >=32).

The registration and reset keys are then encrypted (at S12) using the server's public key, and inserted into a Register message (at S14), along with the unencrypted nonce. In some embodiments, Register message may contain a "reset flag" as a means of indicating to the server that the secure OTA connection should be reset. In such cases, if the owner determines, at S16, that it is necessary to reset the secure connection (for example because the reset key is found in memory but the registration key is not, as described above) then the reset flag of the Register message is set to "true" (at S18). Otherwise, the reset flag of the Register message is set to "false" (at S20). In alternative embodiments, the need for a reset can be indicated by inserting a "null" registration key, or equivalently, a registration key having a predetermined value.

In such cases, the need for a "reset flag" in the Register message is eliminated, and the process steps S16-S20 would be omitted.

In the next step S22, the wireless device 6 calculates and appends a MAC to the register message. In the case of initial Registration of a secure OTA connection, the Registration message should preferably contain an indication of this fact. One convenient way of doing this is to force the MAC to null, since the MAC is not needed for initial registration of the connection. In the case of re-registration of the connection owner wishing to access its previously established secure session, the MAC can be calculated using the stored registration key. In the case of a reset of the connection (i.e., the reset flag of the Register message is set to "true", and/or the registration key is null), the MAC can be generated using the stored reset key.

Upon receipt of the Register message, the server 2 determines if the session owner is requesting an initial registration (at S24). Following the example above, an initial registration may be indicated by a null MAC, although other methods, such as an :"initial registration" flag in the Register messages, may equally be used. In either case, no verification of the MAC is carried out by the server 2. If the session owner is not requesting an initial registration, then a secure session associated with the owner should already exist in memory 14 of the server 2, and thus a copy of the registration and reset keys also will be stored along with the OwnerID of the session owner. In this case, the server 2 can verify the received MAC (at S26) by comparing it to a "checkMAC" calculated from the stored registration and reset key. For example, if the reset flag in the register message has been set to "false", the received MAC should match a "checkMAC" calculated from the registration key associated with the OwnerID stored in the memory; whereas if the reset flag in the register message has been set to "true", the received MAC should match a "checkMAC" calculated from the reset key associated with the OwnerID stored in the memory. In either case, if the MAC verification fails (at S26), the registration process is terminated (at S28). If the MAC is successfully verified, then the server 2 decrypts the registration and reset keys (at S30) contained in the Register message, using its private key in a manner known in the art.

Following successful MAC verification, the server 2 determines whether the secure OTA session is to be reset (at S32). The requirement for a reset may be determined from the Register message (e.g. via the reset flag or null register message described above), or alternatively if the registration key has expired. In either case, if a reset is needed, then the server 2 destroys/removes the stored secure session (at S34), and resets any sequence information used by the record protocol, before proceeding with the registration process.

The server 2 then generates new registration and reset keys for the session (at S36), and saves them in association with the OwnerID contained in the Register message. In the case of either an initial registration (e.g. from step S24 above) or a reset, this step will also include instantiation of a new secure session as a context for the secure OTA connection, and creating an association between the secure session and the new registration and reset keys, for example via the OwnerID. In the case of a simple re-registration, however, the secure session already exists and the OwnerID is already saved in memory, so the new registration and reset keys can be saved in association with the previously stored OwnerID.

The server 2 then generates a confirmation message (at S38) containing the new registration and reset keys, as well as the Nonce obtained from the Register message received from the wireless device 6. The server 2 then generates a new MAC, for example using the new registration key, and inserts the new MAC into the confirmation message (at S40), prior to encrypting the confirmation message (again, using the server's public key) and sending the encrypted confirmation message to the wireless device 6 (at S42).

Upon receipt of the confirmation message, the wireless device 6 decrypts the confirmation message, and verifies the Nonce and MAC. This may, for example, be done by comparing the Nonce received in the confirmation message with that sent by the wireless device 6 in the registration message; and by comparing the MAC received in the confirmation message with a checkMAC computed form the new registration key. If the message is successfully verified, the wireless device 6 completes the registration by storing the new registration and reset keys in device memory 12 for subsequent use (at S46).

As may be appreciated, in some embodiments the wireless device 6 may communicate with more than one server 2 and establish respective secure OTA connections with each. In such cases, the registration and reset keys are stored in device memory 200 with an associated server identifier (serverID) to identify the specific server associated with each particular registration and reset key pair.

As may be appreciated, the use of MAC-tagged messaging ensures that both the server 2 and the wireless device 6 can verify the source of received messages, as is known in the art. In addition, the present technique provides a strong association between the registration key and the secure session, in that: the registration key is used to generate the MAC; the registration key (and thus also the MAC) is changed with each successive re-registration through the life of the secure session, and the secure session survives only as long as the session owner has a valid registration key. Taken together, the use of MAC-tagged messaging coupled with the strong association between the registration key and the secure session and the above noted registration key management techniques, ensures that only the original owner that created the secure session will subsequently have access to the secure session.

Record Protocol

In some embodiments, the Record protocol may be used to secure messaging between the server and the wireless device, following successful completion of the registration (and/or re-registration) procedures described above.

In a representative embodiment, messaging between the server and the wireless device utilizes a message frame made up of an unencrypted portion which includes fields for storing a protocol version and a security mode, for example; and an encrypted portion containing the MAC and payload data. In some embodiments, the encrypted portion may be encrypted using the server's public key. However, preferably the registration and/or reset keys that are associated with the secure session are used for this purpose. With this arrangement, upon receipt of a message, the receiving party (either the server of the wireless device, as the case may be) can check the protocol version to ensure that it is supported by the receiving party. If this check is successful, the security mode can be checked to determine which encryption mode (e.g. identification of an encryption algorithm and/or key) is used, and the encrypted portion of the message decrypted. If decryption is successful, the MAC can be verified, for example by comparing the received MAC against a checkMAC calculated from the stored registration key associated with the secure session. If the MAC verification is successful, then the payload data can be processed as required, for example in accordance with application logic of the session owner and using the private data of the secure session.

In embodiments described above, the MAC is described as being generated from the registration key using, for example, the MAC (SHA1-HMAC) algorithm. However, it will be appreciated that the MAC may equally be generated on the basis of other data. More particularly, the data used to generate the MAC could comprise any combination of data that would be available to a receiver, so that the MAC can be verified by the receiver. For example, the MAC could be generated using a concatenation of the registration key, predetermined fields of the message header (e.g. a message sequence number), and a predetermined portion of (or, if desired, the entire) message payload. Using the Record protocol above, all of the information needed to verify such a MAC would be available to the receiver; either from data stored in memory (e.g. the registration key) or extracted from the decrypted content of the received message. An advantage of this arrangement is that, in addition to verifying the sender of the message and its association with the secure session (which is achieved by a MAC based solely on the registration key), including header fields and/or (some or all of) the message payload in the MAC calculation also ensures that this information was also generated by the authorised sender, in association with the secure session. As will be apparent to those skilled in the art, this technique can prevent replay attacks, in which an attacker inserts the message payload taken from one message into multiple other messages sent to the receiving party.

While the present disclosure is primarily described as a method, a person of ordinary skill in the art will understand that the present disclosure is also directed to an apparatus for carrying out the disclosed method and including apparatus parts for performing each described method step, be it by way of hardware components, a computer programmed by appropriate software to enable the practice of the disclosed method, by any combination of the two, or in any other manner. Moreover, an article of manufacture for use with the apparatus, such as a pre-recorded storage device or other similar computer readable medium including program instructions recorded thereon, or a computer data signal carrying computer readable program instructions, may direct an apparatus to facilitate the practice of the disclosed method. It is understood that such apparatus, articles of manufacture, and computer data signals also come within the scope of the present disclosure.

The embodiments described above are intended to be illustrative only. The scope of the invention is therefore intended to be limited solely by the scope of the appended claims.

A portion of the disclosure of this patent document may contain material that is subject to copyright protection. The copyright owner has no objection to the facsimile reproduction by anyone of the patent document or patent disclosure, as it appears in the Patent and Trademark Office patent file or records, but otherwise reserves all copyright.

The invention claimed is:

1. A method comprising:
establishing a secure session on behalf of a connection owner, the secure session being maintained by a server that is connected to a wireless device via a communications network, the connection owner being associated with the wireless device, the secure session defining a context for a secure over-the-air device connection between the connection owner and the server;
while establishing the secure session, storing, on both the server and the wireless device, a registration key and a reset key, in association with the secure session, wherein the reset key differs from the registration key;

using the registration key to authenticate and optionally to encrypt messages of the established secure session exchanged between the wireless device and the server; and upon determining at the wireless device that the registration key is irretrievable from a memory of the wireless device, generating at the wireless device a request to reset the established secure session, using the reset key to generate at the wireless device a first Message Authentication Code (MAC) from the request, and transmitting the request and the first MAC from the wireless device to the server;

upon receipt of the request and the first MAC at the server, destroying the secure session at the server.

2. The method as claimed in claim 1, wherein the connection owner comprises any one of:
the wireless device;
a device/application-tuple comprising the wireless device and an application installed on the wireless device; and
a device/application-pair comprising the wireless device, an application installed on the wireless device, and an application executing on a remote server.

3. The method as claimed in claim 1, wherein the act of using the registration key to authenticate messages of the secure session comprises:
receiving a message from the connection owner, the message containing a second Message Authentication Code (MAC) generated using at least the Registration key;
validating the second MAC; and
upon successful validation, processing a payload portion of the message using the secure session.

4. The method as claimed in claim 3, wherein the second MAC is calculated using the Registration key alone, and the act of validating the second MAC comprises comparing the second MAC against a checkMAC calculated using the Registration key.

5. The method as claimed in claim 3, wherein the second MAC is calculated using the Registration key in combination with a selected one or more of:
at least a portion of the payload; and one or more fields of a header of the message,
and wherein the act of validating the second MAC comprises comparing the second MAC against a checkMAC calculated using the Registration key in combination with the selected one or more of: at least a portion of the payload; and one or more fields of the header of the message.

6. The method as claimed in claim 1, wherein as part of the secure session the server stores private information associated with the connection owner and destroying the secure session comprises removing the private information from the server.

7. The method as claimed in claim 6, wherein the private information comprises any of a secure Sockets Layer (SSL) connection, a HTTP cookie, a Windows NT™ LAN Manager (NTLM)-authenticated connection and a Windows NT™ LAN Manager (NTLM)-authenticated subscription.

8. A server comprising a processor and a computer readable medium for storing software instructions for controlling the processor to:
establish, on behalf of a connection owner, a secure session with a wireless device connected to the server over a communications network, the connection owner being associated with the wireless device, the secure session being maintained by the server and defining a context for a secure over-the-air device connection between the connection owner and the server,
while establishing the secure session, store in association with the secure session a registration key, a reset key and an identification of the connection owner, wherein the reset key differs from the registration key;
use the registration key to authenticate and optionally to encrypt messages of the established secure session exchanged with the wireless device;
receive from the wireless device a request to reset the established secure session and a Message Authentication Code (MAC), the request generated by the wireless device upon the wireless device having determined that the registration key is irretrievable from a memory of the wireless device; and
upon successfully verifying that the MAC was generated from the request using the reset key, destroy the secure session at the server.

9. The server as claimed in claim 8, wherein as part of the secure session the server stores private information associated with the connection owner and the software instructions to destroy the secure session at the server control the processor to remove the private information from the server.

10. The server as claimed in claim 9, wherein the private information comprises any of a secure Sockets Layer (SSL) connection, a HTTP cookie, a Windows NT™ LAN Manager (NTLM)-authenticated connection and a Windows NT™ LAN Manager (NTLM)-authenticated subscription.

11. A method performed by a server, the method comprising:
establishing, on behalf of a connection owner, a secure session with a wireless device that is connected to the server via a communications network, the connection owner being associated with the wireless device, the secure session being maintained by the server and defining a context for a secure over-the-air device connection between the connection owner and the server;
while establishing the secure session, storing in association with the secure session a registration key, a reset key and an identification of the connection owner, wherein the reset key differs from the registration key;
using the registration key to authenticate and optionally to encrypt messages of the established secure session exchanged with the wireless device;
receiving from the wireless device a request to reset the established secure session and a Message Authentication Code (MAC), the request generated by the wireless device upon the wireless device having determined that the registration key is irretrievable from a memory of the wireless device; and
upon successfully verifying that the MAC was generated using the reset key, destroying the secure session at the server.

12. The method as claimed in claim 11, wherein as part of the secure session the server stores private information associated with the connection owner and destroying the secure session at the server comprises removing the private information from the server.

13. The method as claimed in claim 12, wherein the private information comprises any of a secure Sockets Layer (SSL) connection, a HTTP cookie, a Windows NT™ LAN Manager (NTLM)-authenticated connection and a Windows NT™ LAN Manager (NTLM)-authenticated subscription.

14. A method performed by a wireless device, the method comprising:
while connected to a server via a communications network, initiating establishment of a secure session on behalf of a connection owner associated with the wireless device, the secure session being maintained by the server and defining a context for a secure over-the-air device connection between the connection owner and the server;

while initiating establishment of the secure session, storing in association with the secure session a registration key and a reset key, wherein the reset key differs from the registration key;

using the registration key to authenticate and optionally to encrypt messages of the established secure session exchanged between the wireless device and the server; and upon determining that the registration key is irretrievable from a memory of the wireless device, generating a request to reset the established secure session, using the reset key to generate a Message Authentication Code (MAC) from the request, and transmitting the request and the MAC to the server.

15. A wireless device having data communication capabilities and a memory, the wireless device configured to:

connect to a server via a communications network for a secure over-the-air (OTA) device connection between a connection owner and the server, the connection owner being associated with the wireless device;

initiate establishment of a secure session on behalf of the connection owner, the secure session being maintained by the server and defining a context for the secure OTA device connection;

while initiating establishment of the secure session, store in association with the secure session a registration key and a reset key in the memory, wherein the reset key differs from the registration key;

use the registration key to authenticate and optionally to encrypt messages of the established secure session exchanged between the wireless device and the server; and upon determining that the registration key is irretrievable from a memory of the wireless device, use the reset key to generate a Message Authentication Code (MAC) from the request, and transmit the request and the MAC to the server.

16. A non-transitory computer readable medium comprising software instructions, the software instructions controlling a processor of a server to:

establish, on behalf of a connection owner, a secure session with a wireless device that is connected to the server via a communications network, the connection owner being associated with the wireless device, the secure session being maintained by the server and defining a context for a secure over-the-air device connection between the connection owner and the server;

while establishing the secure session, store in association with the secure session a registration key, a reset key and an identification of the connection owner, wherein the reset key differs from the registration key;

use the registration key to authenticate and optionally to encrypt messages of the established secure session exchanged with the wireless device; and receive from the wireless device a request to reset the established secure session and a Message Authentication Code (MAC), the request generated by the wireless device upon the wireless device having determined that the registration key is irretrievable from a memory of the wireless device;

upon successfully verifying that the MAC was generated using the reset key, destroy the secure session at the server.

17. A non-transitory computer readable medium comprising software instructions, the software instructions controlling a wireless device to:

while connected to a server via a communications network, initiate establishment of a secure session on behalf of a connection owner associated with the wireless device, the secure session being maintained by the server and defining a context for a secure over-the-air device connection between the connection owner and the server;

while initiating establishment of the secure session, store in association with the secure session a registration key and a reset key, wherein the reset key differs from the registration key;

use the registration key to authenticate and optionally to encrypt messages of the established secure session exchanged between the wireless device and the server; and upon determining that the registration key is irretrievable from a memory of the wireless device, generate a request to reset the established secure session, use the reset key to generate a Message Authentication Code (MAC) from the request, and transmit the request and the MAC to the server.

* * * * *